United States Patent
Blatt et al.

(10) Patent No.: US 10,373,778 B2
(45) Date of Patent: Aug. 6, 2019

(54) KEY LIGHT BLOCKERS WITH BELLOWS

(71) Applicant: HEWLETT-PACKARD DEVELOPMENT COMPANY, L.P., Houston, TX (US)

(72) Inventors: David I Blatt, Houston, TX (US); Alan D Peterson, Houston, TX (US); David C Vinson, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/091,020

(22) PCT Filed: Jun. 30, 2016

(86) PCT No.: PCT/US2016/040424
§ 371 (c)(1),
(2) Date: Oct. 3, 2018

(87) PCT Pub. No.: WO2018/004604
PCT Pub. Date: Jan. 4, 2018

(65) Prior Publication Data
US 2019/0066946 A1 Feb. 28, 2019

(51) Int. Cl.
*H01H 13/83* (2006.01)
*G06F 1/16* (2006.01)
*H01H 13/7065* (2006.01)

(52) U.S. Cl.
CPC ........... *H01H 13/83* (2013.01); *G06F 1/1662* (2013.01); *H01H 13/7065* (2013.01); *H01H 2219/054* (2013.01); *H01H 2219/064* (2013.01)

(58) Field of Classification Search
CPC ...................................................... H01H 13/83
USPC ............................................. 362/23.03–23.05
See application file for complete search history.

(56) References Cited

U.S. PATENT DOCUMENTS

| | | | |
|---|---|---|---|
| 4,366,463 A | 12/1982 | Barker | |
| 5,021,638 A | 6/1991 | Nopper et al. | |
| 7,485,824 B2 * | 2/2009 | Rastemborski | H01H 13/48 200/406 |
| 7,745,751 B2 | 6/2010 | Takahashi et al. | |
| 7,850,378 B1 | 12/2010 | Ligtenberg et al. | |
| 8,820,949 B2 | 9/2014 | Takeda | |
| 9,093,229 B2 | 7/2015 | Leong et al. | |
| 2007/0200153 A1 | 8/2007 | Kabushiki | |
| 2010/0089736 A1 | 4/2010 | Tsai et al. | |

(Continued)

FOREIGN PATENT DOCUMENTS

| CN | 2069165 U | 1/1991 |
|---|---|---|
| CN | 1842883 A | 10/2006 |

(Continued)

OTHER PUBLICATIONS

The 10 Best Keyboards, Sep. 27, 2015, <http://www.xiontech.net/the-10-best-keyboards/>.

*Primary Examiner* — Sean P Gramling
*Assistant Examiner* — Keith G. Delahoussaye
(74) *Attorney, Agent, or Firm* — HPI Patent Department

(57) ABSTRACT

In an example, a light blocker may comprise a bellow to extend from an outer edge of a key to an inner edge of a key window to span a key gap in between the key and the key window. The bellow may extend along a periphery of the key, and the bellow may block light originating from under the key from passing through the key gap.

14 Claims, 4 Drawing Sheets

(56) References Cited

U.S. PATENT DOCUMENTS

| | | | |
|---|---|---|---|
| 2010/0108486 A1 | 5/2010 | Yoshida | |
| 2010/0147661 A1 | 6/2010 | Takeda | |
| 2012/0199455 A1* | 8/2012 | Niu | H01H 13/83 |
| | | | 200/308 |
| 2014/0339063 A1 | 11/2014 | Bedolla | |

FOREIGN PATENT DOCUMENTS

| | | |
|---|---|---|
| CN | 101404224 A | 4/2009 |
| CN | 101657075 A | 2/2010 |
| CN | 201594484 U | 9/2010 |

\* cited by examiner

KEY LIGHT BLOCKERS WITH BELLOWS

BACKGROUND

Electronic devices may include user input interfaces. The user may interact with such interfaces in order to control, manipulate, or adjust the function of the electronic device in some way. Such user interfaces may be keys, buttons, knobs, levers, or other devices that a user may interact with. Some electronic devices may be computing devices, and may further include a keyboard as part of a user input interface.

DETAILED DESCRIPTION

Figure 1:
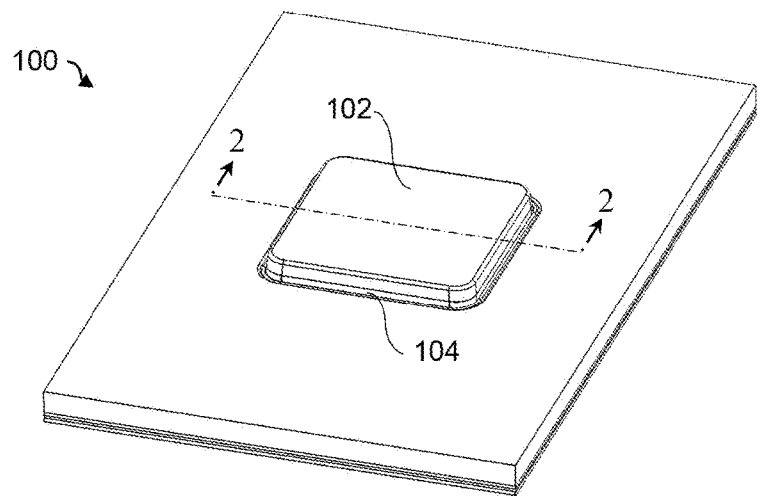
FIG. 1 is a perspective view of an example light blocker.

Electronic devices may include user input interfaces. The user may interact with such interfaces in order to control, manipulate, or adjust the function of the electronic device in some way. Such user interfaces may be keys, buttons, knobs, levers, or other devices that a user may interact with to control an aspect of the electronic device. Computing devices may be electronic devices for carrying out general or specific tasks, and may include components such as motherboards, processors, memory, storage drives, power supplies, displays, or other components typically found in computing devices. Some electronic devices, or computing devices, may also include a keyboard as a user input interface, or as a part of a user input interface.

In some situations, a button or series of buttons, keyboard, or another user input interface of an electronic device may include a backlight to illuminate the interface, an icon thereon, or another feature of the interface. Such backlighting may assist or improve the ability of a user to engage with and use the input interface, especially in a low-light environment. Such backlighting may originate from a light source disposed behind the user input interface, in some situations. Such a light source may be a single light source, or may be multiple light sources spread throughout the user input interface. In some situations, the light source may be an array of light sources, such as an array of Light-Emitting Diodes (LED's), for example, dispersed behind the user input interface.

In some situations, the user input interface may include buttons or keys disposed within a framework of key holes or windows. There may exist spacing or gaps between each key or button and the surrounding framework to allow for assembly or travel clearance of the button or key. In some situations, the light source disposed behind the user input interface may leak out through such gaps or spacing around the keys or buttons. The locations of the light source behind the user input interface and/or the sizing, spacing, and location of the gaps providing clearance for the keys or buttons may result in concentrations of light leaking through the user input interface, and may detract from the user input experience, or the overall user experience with the electronic or computing device. In some situations, it may be desirable to block light from leaking through the gaps or spacing to improve user experience. Further, it may desirable in some situations to diffuse, dilute, or otherwise dim the light that passes through such gaps to a desired or acceptable level.

In some situations, keys or buttons of a user input interface may include a skirt, or a portion that hangs down lower than the surrounding framework or lattice so as to block any light leakage from a light source behind the user input interface. However, some electronic or computing devices may be too thin for a corresponding user input interface to include extra material on each key or button to act as a skirt. Further, the key travel of such a user input interface may be too short to include a skirt on the keys or buttons, and, thus, light may still leak through the user input interface.

Implementations of the present disclosure provide light blockers for use on user input interfaces of computing devices or other electronic devices. Examples of light blockers described herein may prevent light from leaking through such user input interfaces, or may dim or otherwise control the amount and/or location of light illuminating from the user input interface. Further, examples of light blockers described herein may be employable on electronic devices, or user input interfaces thereof, that may otherwise be too thin to employ a skirt or other light-blocking device on the user input interface.

Referring now to FIG. 1, a perspective view of an example light blocker 100 is illustrated. The example light blocker 100 may comprise a bellow 104 to extend between a key 102 and a surrounding framework or lattice. In some situations, the bellow 104 may extend from an outer edge of the key 102 to an inner edge of a key window within the framework or lattice. The bellow 104 may span a key gap in between the key 102 and an edge of the key window. In further implementations, the bellow 104 may extend along a periphery of the key 102, or a portion thereof. The bellow 104 may block or partially block light that may originate from under or behind the key 102 from passing through the key gap, in some situations.

Figure 2A:
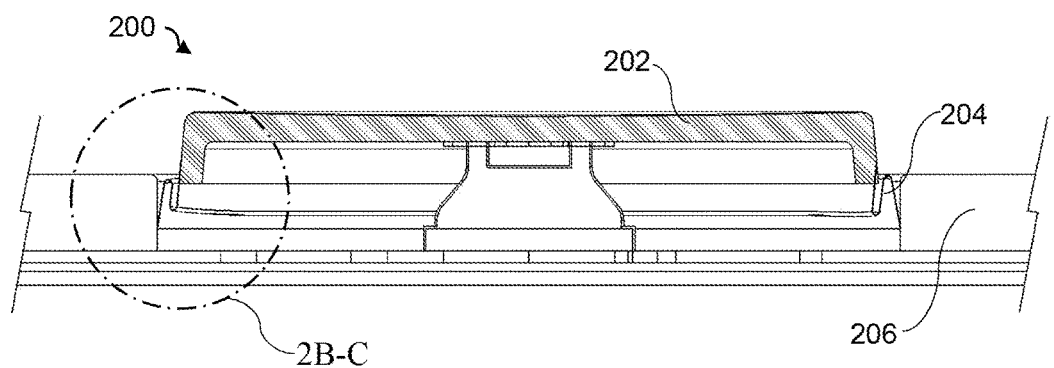
FIG. 2A is a side cross-sectional view of an example light blocker.

Referring now to FIG. 2A, a side cross-sectional view of an example light blocker 200 is illustrated, wherein the cross-section may be taken along a view line similar to that of line 2-2 of FIG. 1. Example light blocker 200 may be similar to example light blocker 100. Further, the similarly named elements of example light blocker 200 may be similar in function and/or structure to the elements of example light blocker 100, as they are described above. The example light blocker 200 may include a bellow 204 to engage with a key 202 of a user input interface of an electronic device. In some implementations, the electronic device may be a computing device and include components such as processors, memory, storage drives, power supplies, or other components typically found in computing devices. In some implementations, the electronic device may be a desktop personal computer (PC), a notebook PC, a tablet PC, a smartphone, or another electronic device having a user input interface. A user input interface may refer to a device or devices, such as buttons, knobs, screens, touchscreens, switches, or other input devices, or a series or array of such devices, that may be used to operate, adjust, alter, or otherwise provide input to an electronic device. In some implementations, the user input interface may be relatively simple, for example, including a single input device, or, in other implementations, the user input interface may be more complicated, or have multiple input devices or a series of devices. In some implementations, the key 202 may be a button, or a portion thereof, or another part of the user input interface, such as a knob, joystick, or another input device as described above. In further implementations, the key 202 may be a key or a keycap from a keyboard of a computing device, and may be engaged with an electronic button or switch beneath the key 202 to register a keystroke of a user. In some implementations, the key 202 may be a standalone or separate input device, or may be disposed near other input devices in other implementations. In some implementations, the user input interface may be a keyboard having multiple keys. In further implementations, the keyboard may be disposed on a notebook computer or PC.

In some implementations, the key 202 may be engaged with or disposed in a framework or lattice 206 of the electronic device, or user input interface thereof. The lattice 206 may include a key window within which the key 202 is to sit, be disposed, or travel within. In some implementations, the lattice 206 may include multiple key windows, each to receive a separate key 202. In such an implementation, the other keys 202 may also each comprise a bellow 204. In further implementations, only select keys 202 of the user input interface may include a bellow 204, or only one key 202 may include a bellow 204 in yet other implementations. In further implementations, the lattice 206 may include a key window or multiple key windows that are to receive multiple keys within them. In other words, multiple keys may share a key window. In such an implementation, the multiple keys that occupy the same key window may have a bellow 204 that extends between them, as well as extending between the keys and the edges of the key window.

Figure 2B:
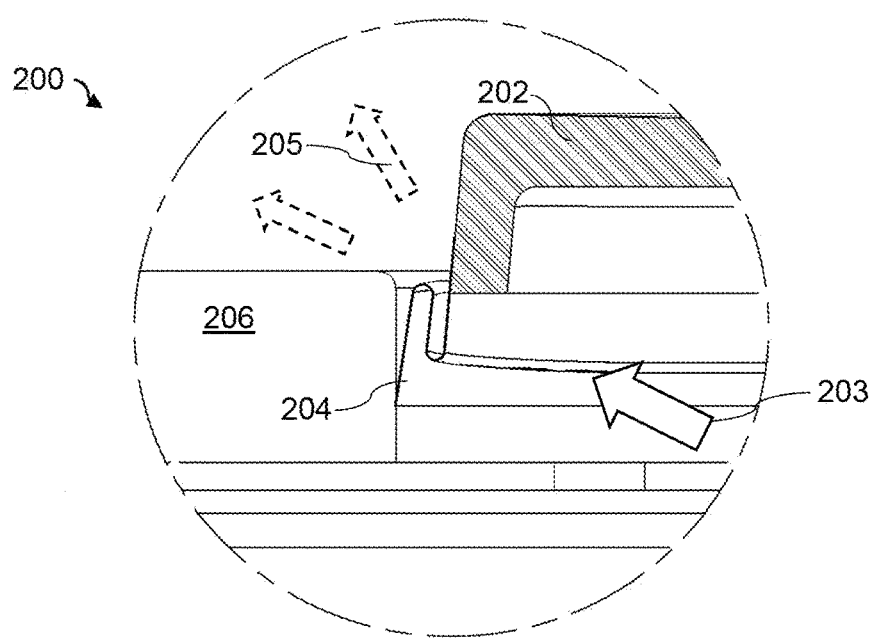
FIG. 2B is a detail cross-sectional view of an example light blocker.

Referring additionally to FIG. 2B, a detail cross-sectional view of an example light blocker is illustrated. In some implementations, the electronic device, or the user input interface thereof, may include a light source, represented by arrow 203 in FIG. 2B. Note, the light source may be considered to be part of the light blocker, in some implementations, and may also illuminate or shine in additional directions to the direction represented by arrow 203. The light source 203 may be disposed behind or underneath the key 202, and/or the lattice 206, in some implementations. In some implementations, the light source may act as a backlight for the user input interface. In further implementations, the light source may include multiple separate light sources, for example, multiple LED's, light bulbs, or other illuminating components capable of generating light. In yet further implementations, multiple keys 202 of the user input interface may have a light source disposed behind or underneath the respective key for the purpose of collectively backlighting the interface. In some implementations, the light source 203 may illuminate an icon or symbol disposed on the key 202, so a specific key 202 is readily identifiable by a user of the electronic device. In some implementations, the area of the key 202 including the icon may be more translucent or more transparent than other portions of the key 202 such that the light source 203 may illuminate the icon, and not the surrounding key area. In other words, the icon may allow light from the light source to pass through the icon to illuminate the icon, while the surrounding material of the key 202 may not allow light from the light source to pass through the key 202, in some implementations. In further implementations, the key 202 may include an opaque color or material, while the icon includes a translucent color or material.

In some implementations, the fitment of the key 202 within the key window of the lattice 206 may define a key gap in between the key 202 and the key window. In further implementations, the key gap may be present on some or all of the sides of the key 202 and/or key window. In some implementations, the key gap may vary in size or width around the key, or in other areas of the user input interface. In yet further implementations, the key gap may extend from an exterior or outer edge of the key 202 to an interior or inner edge of the key window. In some implementations, the light blocker 200 may include a bellow 204 that may span the key gap in between the key 202 and the key window. The bellow 204 may be a membrane, film, or another layer suitable to extend across the key gap. In some implementations, the bellow 204 may be flexible, bendable, malleable, or otherwise elastically deformable. The bellow 204 may comprise silicone, thermoplastic polyurethane, or another polymer material, in some implementations. In further implementations, the bellow 204 may be formed integrally with the key 202 and/or the lattice 206 in a molding or overmolding manufacturing operation. In other implementations, the bellow 204 may be assembled on to the key 202 and/or the lattice 206 as a separate component. In some implementations, the bellow 204 may comprise a different material or a material that is less rigid than the key 202 and/or the lattice 206. In yet further implementations, the key 202 and/or the lattice may comprise a material such as plastic or metal, and the bellow 204 may comprise a more flexible material, such as rubber or another suitable polymer.

The bellow 204 may be disposed within the key gap, or extend across or span the key gap such that the bellow 204 blocks light originating from under or behind the key 202, or the lattice 206, for example, from the light source 203, from passing through, shining through, or otherwise being transmitted through the key gap. As such, the bellow 204 may comprise a material that is opaque, in some implementations, in order to prevent any light from leaking from the light source 203 through the key gap. In further implementations, the bellow 204 may comprise a material that is not fully opaque, but partially transparent or translucent in order to let a partial or predetermined amount of light from the light source pass through the bellow 204 and, thus, the key gap. Thus, the amount of light that may escape through the key gap around the key may be metered, controlled, or otherwise limited by employing a bellow 204 having a predetermined transparency or translucency. In other words, the bellow 204 may dilute or diffuse the light passing through the key gap that is emitted from the light source. In some implementations, this may be to avoid concentrations of light leaking through the user input interface, or make the light emitted from the key gaps appear more consistent, dull, even, or dispersed throughout the key gap or across multiple keys and key gaps. In further implementations, the opacity of the bellow 204 may change or vary from key to key, or even may vary around a single key and key window. Such varying opacity may allow the light to only shine through the key gap or key gaps in desired areas, or at desired intensities. The partial emittance of light through the key gap as described above may be represented by phantom arrows 205 in FIG. 2B.

In some implementations, the bellow 204 may span the key gap and extend around the entire periphery of the key 202 and/or key window so as to block light from the light source, or a portion of the light therefrom, from passing through the key gap. In further implementations, the bellow 204 may only span the key gap through a portion of the periphery of the key 202 and, therefore, may only block light, or a portion thereof, throughout that portion of the periphery. In further implementations, the bellow 204 may block light from passing through the key gap along a portion of the periphery of the key 202, and may allow a portion of the light to pass through the bellow 204 and the key gap along another portion of the periphery of the key 202. In yet further implementations, the bellow 204 may only span the key gap on select sides of the key. For example, in some implementations, the bellow 204 may cover, or extend along the length of opposite sides of the key 202, or adjacent sides of the key 202 in other implementations, so as to block light from the light source, or a portion of the light therefrom, from passing through the key gap along the covered sides.

Figure 2C:
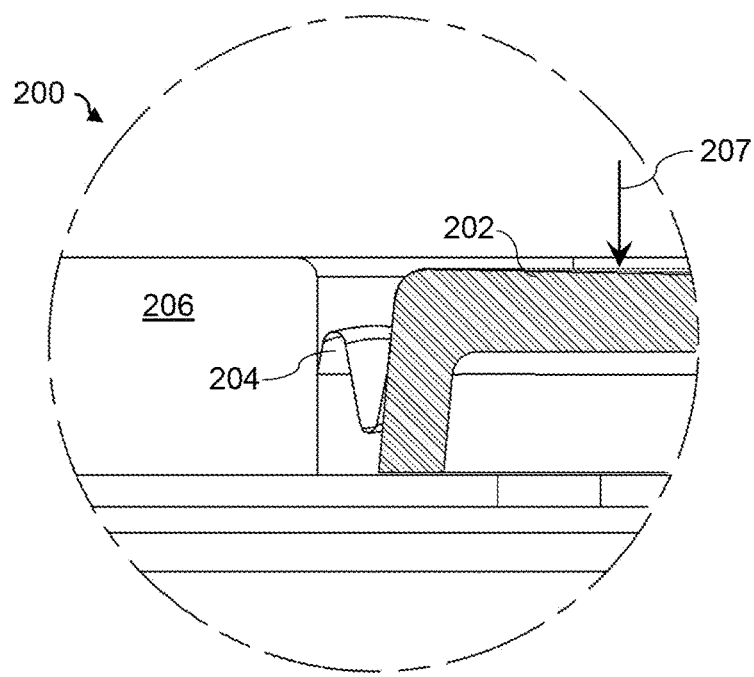
FIG. 2C is a detail cross-sectional view of an example light blocker.

Referring additionally to FIG. 2C, a detail cross-sectional view of the example light blocker 200 is illustrated, wherein the key 202 has been moved through a key travel of the key 202. In some implementations, the key 202 may be movable between a raised position, as illustrated in FIG. 2B, and a depressed position, as illustrated in FIG. 2C. In some implementations, the key 202 may move or travel from the raised position to the depressed position after encountering a pressing force, represented by arrow 207. Such a pressing force may be a pressing action from a user, in some implementations, or another component, in other implementations. In further implementations, the key 202 may allow the electronic device, or the user input interface thereof, to register a keystroke upon being moved to the depressed position. The material of the bellow 204 may enable the bellow 204 to remain engaged with the key 202 and the lattice 206 throughout the entire key travel of the key 202, in some implementations. In other words, the bellow 204 may be sufficiently pliable or flexible such that it may elastically deform as the key 202 moves throughout its range of motion, as illustrated in FIG. 2C. Thus, the bellow 204 may continue to block or partially block a predetermined amount of light from the light source from passing through the key gap throughout the entire travel of the key 202. In some implementations, the travel of the key 202 may be resisted in a direction by a bias member, such as a spring, or other resilient and elastically deformable component.

Figure 3A:
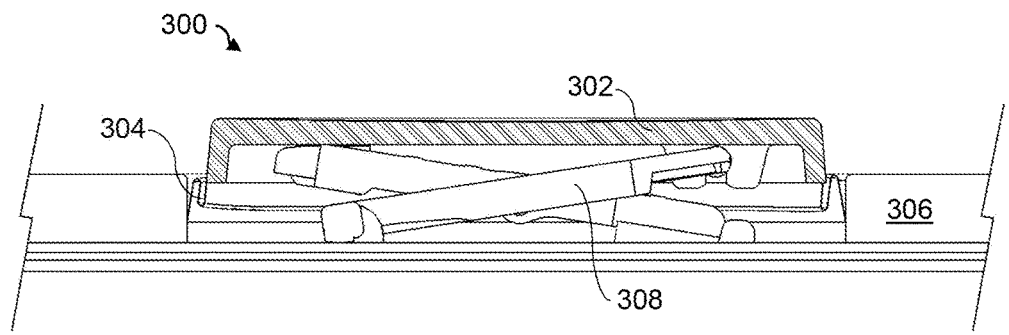
FIG. 3A is a side cross-sectional view of an example light blocker.
Figure 3B:
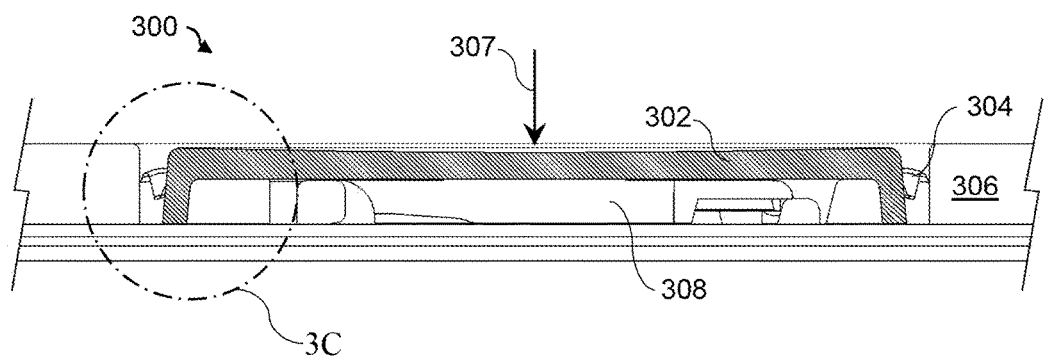
FIG. 3B is a side cross-sectional view of an example light blocker.

Referring now to FIGS. 3A-B, side cross-sectional views of an example light blocker 300 is illustrated. Example light blocker 300 may be similar to example light blocker 100 or 200. Further, the similarly named elements of example light blocker 300 may be similar in function and/or structure to the elements of example light blocker 100 or 200, as they are described above. In some implementations, the example light blocker 300 may include a key 302, and a bellow 304 engaged with the key 302 and a surrounding framework or lattice 306. The light blocker 300 may be a part of an electronic device, in some implementations, or a user input interface thereof. Further, the key 302 may be engaged with a scissor linkage 308 of the electronic device. The scissor linkage 308 may enable the key 302 to travel between a raised position, shown in FIG. 3A, and a depressed position, shown in FIG. 3B. In some implementations, the depressed position might be the lowest point in the key travel. In further implementations, the depressed position may be a position at which the key 302 contacts or comes close to contacting a substrate upon which the lattice 306 and/or the key 302 is disposed. In some implementations, the scissor linkage 308 may include two linkage arms engaged with each other in an "X" formation, such that they form a pantograph. The scissor linkage 308 may flatten as the key 302 undergoes a pressing action, represented by arrow 307, in further implementations. The pressing action 307 may transition the key 302 from the raised position, through a key travel, to the depressed position.

Figure 3C:
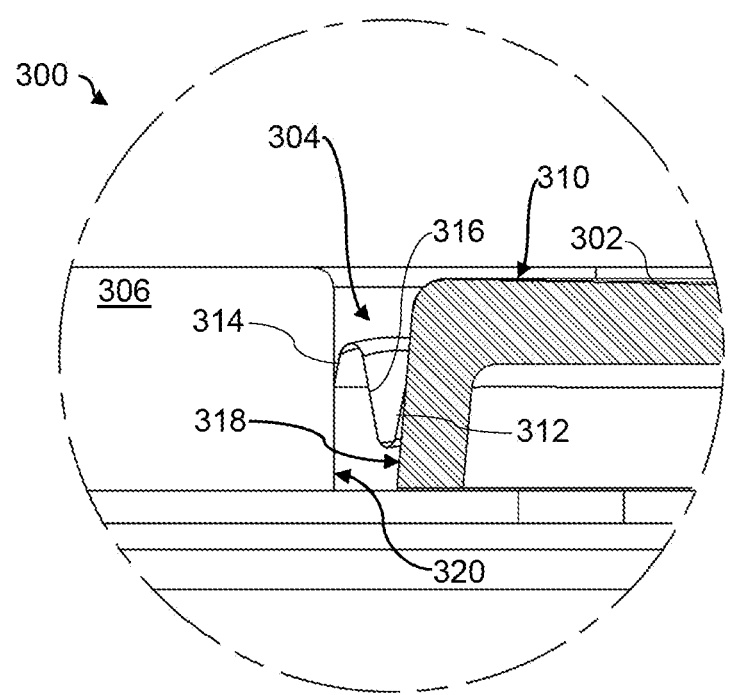
FIG. 3C is a detail cross-sectional view of an example light blocker.

Referring now to FIG. 3C, a detail cross-sectional view of an example light blocker 300 is illustrated, wherein the key 302 is disposed in the depressed position. The bellow 304 may extend from the key 302, across a key gap, to the lattice 306, in some implementations. In further implementations, the bellow 304 may extend from an outer edge 318 of the key 302 to an inner edge 320 of a key window of the lattice 306. The bellow 304 may include a first portion 312, a second portion 314, and a third portion 316, in some implementations. The first, second, and third portions may be part of a unitary component making up the bellow 304, in some implementations. In other implementations, any of the first, second, or third portions may be a separate component from the others, and may be assembled on to the other portions to define the bellow 304.

The first portion 312, in some implementations, may be engaged with the outer edge 318 of the key. Further, the second portion 314 may be engaged with the inner edge 320 of the key window. Additionally, the third portion 316 may connect the first and second portions to one another, in further implementations. In some implementations, the first portion 312 may engage with or connect to the key 302 at a point along the outer edge 318 that is in between the a top surface 310 of the key and a bottom edge of the key. In further implementations, the first portion 312 may attach to the key 302 at a midpoint along the outer edge 318. In other words, the bellow 304, or the first portion 312 thereof, may connect with the side of the key 302, and not the top surface 310, or the bottom edge of the key 302. Similarly, the second portion 314 may engage with or connect to the lattice 306 at point along the inner edge 320 that is in between a top surface of the lattice 306 and a bottom surface of the key window, or the substrate contacting therewith. In further implementations, the second portion 314 may engage with the inner edge 320 at a midpoint of the inner edge 320. Together, the first, second, and third portions of the bellow 304 may form an alternating shape, or an accordion shape or structure, in some implementations. The accordion structure, in conjunction with the flexible nature of the material of the bellow 304, may allow the bellow 304 to move with the key 302 throughout the entire key travel of the key.

What is claimed is:

1. A light blocker, comprising:
    a flexible bellow to extend from an outer edge of a key to an inner edge of a key window to span a key gap in between the key and the key window,
    wherein the bellow is to extend along a periphery of the key,
    wherein the bellow is to block light originating from under the key from passing through the key gap, and
    wherein the flexible bellow has an accordion structure.

2. The light blocker of claim 1, wherein the bellow is to block light from under the key throughout an entire key travel of the key.

3. The light blocker of claim 1, wherein the bellow is to allow a portion of the light originating from under the key to pass through the bellow and the key gap.

4. The light blocker of claim 3, wherein the bellow is to block light from passing through the key gap along a portion of the periphery of the key, and to allow a portion of the light to be transmitted through the bellow and the key gap along another portion of the periphery of the key.

5. The light blocker of claim 1, wherein the bellow is to span the key gap and extend around the entire periphery of the key.

6. The light blocker of claim 1, wherein the bellow is to extend along the length of opposite sides of the key.

7. The light blocker of claim 1, wherein the bellow is to extend along the length of adjacent sides of the key.

8. A light blocker, comprising:
a bellow to extend from an outer edge of a key disposed in a key window to art inner edge of the key window to span a key gap in between the key and the key window,
wherein the bellow is flexible to allow the bellow to move with the key,
wherein the bellow is to extend along a portion of a periphery of the key,
wherein the bellow is to block light originating from a light source under the key from passing through the key gap, and
wherein the flexible bellow has an accordion structure.

9. The light blocker of claim 8, wherein the bellow comprises a first portion engaged with the outer edge of the key, a second portion engaged with the inner edge of the key window, and a third portion connecting the first and second portions, and
wherein the first, second, and third portions form the accordion structure.

10. The light blocker of claim 8, wherein the key is engaged with a scissor linkage, the scissor linkage to enable the key to travel between a raised position and a depressed position,
wherein the bellow is to block light from passing through the key gap throughout the entire travel of the key.

11. The light blocker of claim 8, wherein the key includes an icon, the icon to allow light from the light source to pass through the icon to illuminate the icon.

12. A keyboard, comprising:
a key disposed within a key window of the key board; a light source disposed behind the key; and
a flexible bellow to extend from an outer edge of the key to an inner edge of the key window to span a key gap in between the key and the key window,
wherein the bellow is to block light from the light, source from passing through the key gap, and
wherein the flexible bellow has an accordion structure.

13. The keyboard of claim 11, further comprising a lattice including multiple key windows, wherein each key window is to receive a separate key.

14. The keyboard of claim 12, further comprising a bellow to extend across each key gap in between the key and the respective key window.

* * * * *

UNITED STATES PATENT AND TRADEMARK OFFICE
CERTIFICATE OF CORRECTION

PATENT NO. : 10,373,778 B2
APPLICATION NO. : 16/091020
DATED : August 6, 2019
INVENTOR(S) : David I Blatt et al.

Page 1 of 1

It is certified that error appears in the above-identified patent and that said Letters Patent is hereby corrected as shown below:

In the Claims

In Column 7, Line 7 (approx.), Claim 8, delete "art" and insert -- an --, therefor.

In Column 8, Line 10 (approx.), Claim 12, delete "key board;" and insert -- keyboard; --, therefor.

In Column 8, Line 15 (approx.), Claim 12, delete "light," and insert -- light --, therefor.

Signed and Sealed this
Thirty-first Day of December, 2019

Andrei Iancu
*Director of the United States Patent and Trademark Office*